J. H. & C. H. CAMPBELL.
DESICCATING MILK.
APPLICATION FILED FEB. 16, 1903.
910,784.
Patented Jan. 26, 1909.
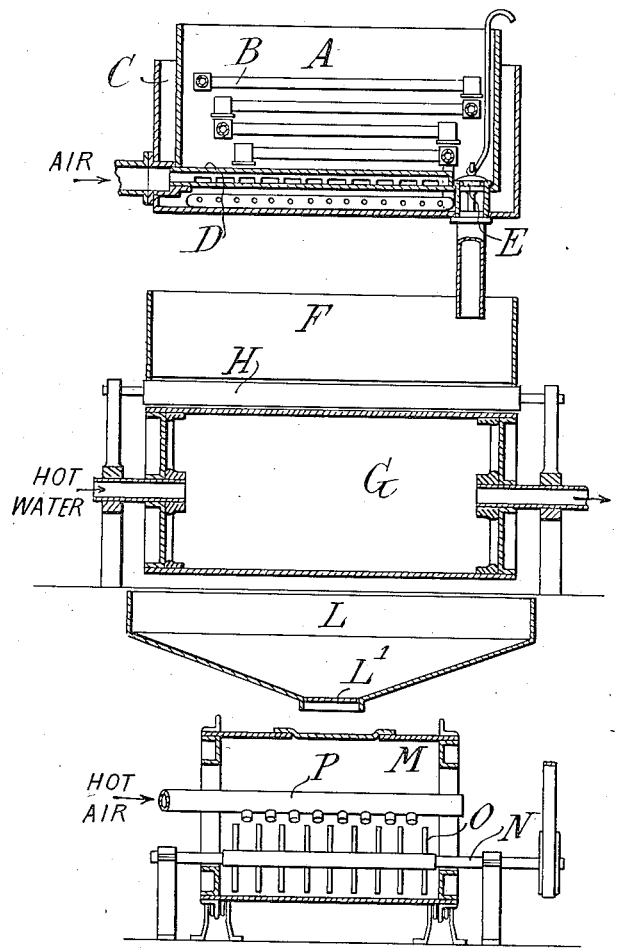
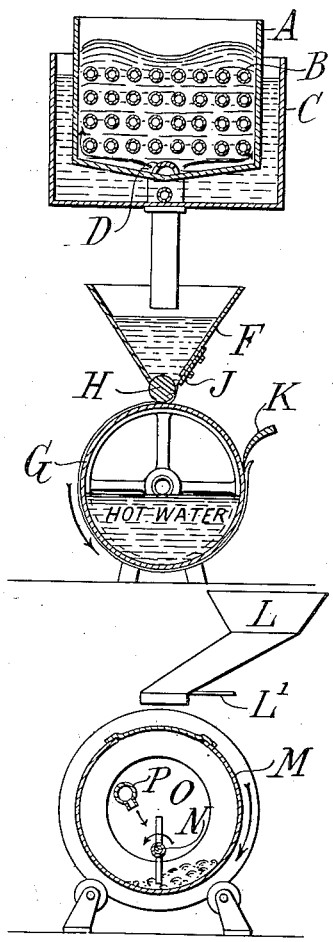
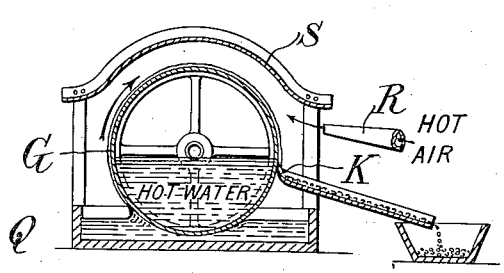
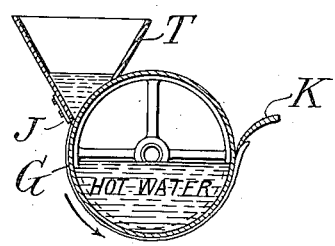
WITNESSES:
Fred White
René Bruine
INVENTORS:
Joseph H. Campbell & Charles H. Campbell,
By Attorneys,

UNITED STATES PATENT OFFICE.

JOSEPH H. CAMPBELL, OF NEW YORK, N. Y., AND CHARLES H. CAMPBELL, OF PHILADELPHIA, PENNSYLVANIA, ASSIGNORS, BY DIRECT AND MESNE ASSIGNMENTS, TO NATIONAL NUTRIENT COMPANY, OF JERSEY CITY, NEW JERSEY, A CORPORATION OF NEW JERSEY.

DESICCATING MILK.

No. 910,784.　　　Specification of Letters Patent.　　　Patented Jan. 26, 1909.

Application filed February 16, 1903. Serial No. 143,471.

*To all whom it may concern:*

Be it known that we, JOSEPH H. CAMPBELL and CHARLES H. CAMPBELL, both citizens of the United States, and residing in the city, county, and State of New York, and in the city and county of Philadelphia and State of Pennsylvania, respectively, have jointly invented certain new and useful Improvements in Desiccating Milk, of which the following is a specification.

Our invention relates to the treatment of milk for the production of a desiccated milk product, which treatment is also applicable to substances having similar properties to milk, such for example as mixtures of milk and other substances.

By our process a product is obtained from which the moisture is so completely removed that the milk is reduced to the form of dry cakes or a dry powdered or granular mass, which can be kept indefinitely and shipped even to tropical climates as safely as wheat flour.

According to the preferred process the product contains all the non-fatty solids of the milk, either with or without a substantial percentage of the fatty solids, and moreover the casein and other proteids are preserved with their original peptogenic properties and are readily soluble in water. The percentage of cream which we prefer to retain is such that the product shall not be excessively greasy, and shall be so dry as to permit substantially complete desiccation and granulation to a desired fineness. The product may be ground or powdered and if this is to be done, it should not contain more than about ten per cent. of fat.

Our process may therefore be carried out in such a way as to preserve not only the pleasant taste of rich fresh milk, but also its nutritive value.

The advantages of desiccated milk in cheapness of handling and transportation, in keeping qualities, and in the manufacture of confectionery and bakers' or other food products, and in several other respects, are well known.

According to our improved process we first produce a thickened liquid or semi-liquid milk, as for example by separating a substantial percentage of the cream therefrom, and concentrating the remainder until it is reduced to a thickened liquid or semi-liquid. We then deliver the thickened liquid or semi-liquid to a moving heated surface, and spread it in a thin coating thereon, carrying it on such surface until it becomes substantially solid and of a consistency resembling stiff putty, after which it may be granulated or further desiccated and ground.

Previous attempts to desiccate milk without removing the cream, have generally resulted in a pasty or cheesy product extremely liable to fermentation, and comparatively difficult to pack or store, and difficult to redissolve because of the inability of the water to penetrate it as compared with a granular or powdered product. By the removal of a substantial percentage of the cream so as to leave twenty per cent. or less of butter fat in the final product, this difficulty is avoided, while retaining sufficient fat to give the product nearly as rich a flavor as that of fresh whole milk.

It is within our invention to remove all the cream where a product without fat is desired. The desired percentage of fat in the product may be obtained either by removing a sufficient portion of cream at the beginning of the process, or at any time before the delivery of the thickened liquid to the moving heated surface, or by first removing all the cream so that the latter shall not be subjected to the first concentration, and adding a desired percentage to the thickened liquid before delivering it to the moving heated surface.

Various attempts to desiccate milk upon moving heated surfaces have been made, but the amount of water present is so great that its complete evaporation in such a way cannot be accomplished except by the use of excessively high temperatures. Such high temperatures destroy or injure the peptogenic properties of the proteids, and render them comparatively insoluble. They have likewise a tendency to change the milk sugar. By performing only the second stage of the desiccation upon a moving heated surface, the milk having first been reduced, preferably in a body as hereinafter explained, to a thickened liquid or semi-liquid, we are enabled to avoid the difficulties mentioned, and to avoid also the resort to chemical agents which has been proposed as a means of overcoming them. The first concentration may be continued until only one-fifth or one-sixth of the volume or of the original weight of milk is left. It is perfectly feasible to feed this thickened liquid little by little to a moving heated surface and get rid of the comparatively small quantity of water remaining, without excessive temperatures.

The specific manner of effecting the concentration to a thickened liquid may be varied; any of the known processes of making condensed milk being suitable. We prefer, however, to utilize the process described in Patent No. 668,161 of February 19, 1901 to Joseph H. Campbell, so as to insure a product of good color and taste, free from burned particles, and containing all the original solids. Said process may be described briefly as consisting in applying heat so as to partially vaporize the milk, and exposing it at the same time in open vessels at substantially atmospheric pressure to a blast of air in such volume as to carry off the heated vapor produced, and to maintain the milk at a temperature below that of the applied heat, whereby the milk is concentrated rapidly and at a low temperature, the temperature of the milk being preferably maintained below the coagulating point of albumen so as to retain the original solubility and peptogenic qualities of the proteids. The milk may be delivered little by little to the moving heated surface, being at the same time mechanically spread thereon in a thin coating, or it may be delivered in a body to a reservoir of which such moving surface forms a wall, being drawn out of such reservoir by the continued movement of such surface; the comparatively low temperature of the moving surface permitting this without injury.

We will describe in detail a specific process embodying our invention, reference being made to the accompanying drawings showing more or less diagrammatically various apparatus with which the process can be carried out.

Figures 1 and 2 are longitudinal and transverse sections respectively of apparatus for carrying out a complete process of reducing the milk to granular form; Figs. 3 and 4 are cross-sections of apparatus for carrying the thickened liquid on a moving heated surface.

With this apparatus, the milk, whole or skimmed or partly skimmed as explained above, is put into a concentrating tank A, where it is maintained at a desired evaporating temperature below the coagulating point of albumen by means of hot water circulated through coils B and a jacket C so as to vaporize a portion of it; exposing it at the same time to a blast of air through the perforated pipe D, the volume of air supplied depending upon the applied temperature and the desired temperature of the milk. The blast of air carries off the heated vapor produced by the applied heat and maintains the milk at a temperature below that of the applied heat. This difference in temperature in turn hastens the process, the external heat being continually taken up by the milk and carried off with a portion of the vapor by the blast of air.

After concentrating the milk to the desired extent in the tank A, the valve E is opened to let the thickened or semi-liquid milk into a trough-shaped receptacle F, whence it is fed to the surface of a slowly rotating cylinder G, being preferably spread thereon mechanically as by means of a roller H between the bottom of the trough and the top of the cylinder. The rapidity of the feed from the trough F may be controlled by an adjustable plate J. The cylinder G is kept supplied preferably through hollow central bearings at its ends, with water preferably at a temperature below the coagulating point of albumen, and below 158 degrees F., at which point the decomposition of milk sugar while wet commences. Special means may be provided for exhausting the air from the upper portion of the cylinder G so as to permit it to be entirely filled with water if desired. The cylinder G is rotated in the direction of the arrow at a speed depending upon the thickness of the semi-liquid milk fed to it, and the temperature of the water. By suitably proportioning these features the milk is changed rapidly from a semi-liquid to a substantially solid coating, which may be scraped off as by a fixed scraper K.

The milk may be reduced to the final condition desired on the cylinder G. The product of such a process is flaky, fluffy and porous, as distinguished from the granular or floury product obtained by the process hereinafter described in detail. This flaky, fluffy, porous product however is not claimed in this application, being the subject of another pending application. I prefer, however, to use such an apparatus only for reducing it from a semi-liquid to a solid state, and to subsequently further treat the solid product to eliminate substantially all the moisture. For example, the solid product as scraped off the cylinder G may be allowed to fall into hopper L, and from there introduced through a sliding valve L' into a drum M with inwardly flanged ends. When a batch of the solid product has been fed to the drum M, the latter is closed and is rotated in the direction of the arrow. Simultaneously a shaft N within the drum is rotated in the opposite direction, this shaft carrying arms O which break the lumps. At the same time hot air is introduced through a pipe P. The hot air constantly evaporates the moisture at the surface of the lumps, and as these are continually broken, to expose fresh surfaces, the whole mass is soon reduced to a granular and substantially dry product.

The delivery of the semi-liquid mass to a moving surface, and its reduction thereon to a substantial solid, may be also effected with the apparatus of Fig. 3. In this case the semi-liquid milk is delivered to a tank Q, so that a large body of it is in constant contact with the moving surface of the cylinder G, heated by hot water within it as in the previous case, and rotated constantly in the direction of the arrow. The coating of the semi-liquid is carried around as indicated, and scraped off by a scraper K into a trough, which conducts it into any suitable receptacle, or into an apparatus for further drying it, such as the apparatus M of Fig. 1.

The process may be somewhat hastened either in this apparatus or in any other apparatus, by blowing hot air on the traveling semi-liquid or pasty coating, as by means of a nozzle R. Preferably a curved plate S extends around a portion of the cylinder to maintain the heated air in contact with the milk as long as possible. Or the semi-liquid mass may be delivered in a considerable body to a receptacle T (Fig. 4) at the top of the cylinder G, and of which such cylinder forms a lower wall. In this case the cylinder being in contact with the body of milk, heats it, and to some extent evaporates it, and then by its continued rotation draws out a coating of the milk and carries it around to the scraper K, where it may be handled as previously described. In this construction also the feed of the coating to the moving heated surface may be regulated by the adjustable plate J at the lower edge of the receptacle T. In this case also hot water or other heating medium of suitable temperature is supplied to the inside of the cylinder G.

The degree of concentration to which the milk is brought in the first stage of the process will depend to some extent on the capabilities of the apparatus used. For example with the tank A illustrated the concentration may be rapidly and advantageously effected until the mass becomes so thick as not to circulate freely and not to close immediately the orifices caused by the passage of air through it. This condition is reached when the milk is reduced to less than about one-fifth or one-sixth of its original volume.

In a previous patent, No. 668,162, of February 19, 1901, we have described a method of treating milk which consists in maintaining a supply within a horizontal rotating drum so that as the drum rotates the milk is successively drawn out into a film and returned to the deeper mass resting in the bottom to take up more liquid and increase the thickness of the coating until finally the entire mass is carried around in a thick sticky coating. The only heat is obtained from a current of hot air blown on the coating of milk. According to our present process, on the other hand, the surface or plate on which the film is carried is heated from the opposite side,—a feature which renders the process very rapid and which was not feasible with the thick coating carried up on the cylinder of the previous patent, experiments having shown that the milk immediately against the metal was burned and discolored by even a moderately hot cylinder on account of the impossibility of evaporation from the portion of the coating immediately against the metal. Also in the present process we supply the milk little by little to the cylinder and spread it by positive means into a thin layer, and we carry the coating or film continually on the cylinder without taking up any more liquid, but completing the drying, before the cylinder makes a complete revolution, and because of the thinness of the film and the rapid evaporation therefrom we are enabled to heat the cylinder sufficiently to change the film from a semi-liquid to a hard state in a short time without raising its temperature too high.

Though we have described with great particularity of detail a process embodying our invention, yet it is not to be understood that the invention is limited to the specific embodiment described. Many variations of the same are possible to those skilled in the art, without departure from the invention.

What we claim is:—

1. The process of desiccating milk which consists in separating a substantial percentage of the fat therefrom, applying heat to the remainder to partially vaporize the same, exposing it at the same time to a blast of air in such volume as to carry off the heated vapor produced and to maintain the milk at a temperature below the coagulating point of albumen, whereby the milk is concentrated, in a body so rapidly as to avoid souring and at such a low temperature as to preserve the solubility and peptogenic quality of the proteids, to a thickened liquid or semi-liquid, delivering the thickened liquid or semi-liquid little by little to a moving surface heated from the side opposite to that on which the liquid is delivered and spreading it in a thin coating thereon, carrying said coating continually and without any addition of further liquid on such surface until it has become substantially solid, the temperature of the coating being maintained below about 158 degrees F., removing the solid mass from said surface, and subsequently further drying and reducing the size of the particles.

2. The process of desiccating milk which consists in separating a substantial percentage of the fat therefrom, applying heat to the remainder so as to partially vaporize the same at atmospheric pressure, exposing it at the same time to a blast of air in such volume as to carry off the heated vapor produced and to maintain the milk at a temperature below that of the applied heat, whereby the milk may be concentrated in a body rapidly and at a low temperature to a thickened liquid or semi-liquid, delivering the thickened liquid or semi-liquid to a moving surface heated from the side opposite to that on which the liquid is delivered and spreading it in a thin coating thereon, carrying said coating continuously and without any addition of further liquid on such surface until it has become substantially solid, removing it from said surface, and further drying it and reducing the size of the particles.

3. In obtaining dry milk, the process which consists in separating a substantial percentage of the fat therefrom, partially concentrating the remainder in a body and at atmospheric pressure to reduce it to a thickened liquid or semi-liquid, delivering the thickened liquid or semi-liquid little by little to a moving surface heated from the side opposite to that on which the liquid is delivered and spreading it in a thin coating thereon, carrying said coating continuously and without any addition of further liquid on such surface until it has become substantially solid and then removing it from said surface.

4. In obtaining dry milk, the process which consists in separating a substantial percentage of the fat therefrom, partially concentrating the remainder at atmospheric pressure to reduce it to a thickened liquid or semi-liquid, delivering the thickened liquid or semi-liquid to a moving surface heated from the side opposite to that on which the liquid is delivered and spreading it in a thin coating thereon, carrying said coating continuously and without any addition of further liquid on such surface until it has become substantially solid and then removing it from said surface.

5. In obtaining dry milk, the process which consists in producing a thickened liquid or semi-liquid milk containing a substantial percentage of cream, delivering said thickened liquid or semi-liquid to a moving surface heated from the side opposite to that on which the liquid is delivered and spreading it in a thin coating thereon, carrying said coating continuously on such surface until it has become substantially solid, the rate of movement and length of the surface, the temperature, and the thickness of the thickened milk being such as to effect the substantial solidity of the coating in less than a complete circuit of the moving surface, and then removing it from said surface.

6. In obtaining dry milk, the process which consists in producing a thickened liquid or semi-liquid milk, delivering said thickened liquid or semi-liquid to a moving surface heated from the side opposite to that on which the liquid is delivered and spreading it in a thin coating thereon, carrying said coating continuously on such surface and simultaneously blowing hot air thereon until it has become substantially solid, the rate of movement and length of the surface, the temperature, and the thickness of the thickened milk being such as to effect the substantial solidity of the coating in less than a complete circuit of the moving surface, and then removing it from said surface.

7. In obtaining dry milk, the process which consists in producing a thickened liquid or semi-liquid milk, delivering said thickened liquid or semi-liquid to a moving surface heated from the side opposite to that on which the liquid is delivered and spreading it in a thin coating thereon, carrying said coating continuously on such surface until it has become substantially solid, the rate of movement and length of the surface, the temperature, and the thickness of the thickened milk being such as to effect the substantial solidity of the coating in less than a complete circuit of the moving surface, and then removing it from said surface.

8. In obtaining dry milk, the process which consists in producing a thickened liquid or semi-liquid milk, delivering said thickened liquid or semi-liquid to a moving surface heated below about 158° F. from the side opposite that on which the milk is delivered and spreading it in a thin coating thereon, carrying said coating continuously and without any addition of further liquid on such surface until it has become substantially solid, and then removing it from said surface.

In witness whereof, we have hereunto signed our names in the presence of two subscribing witnesses.

JOSEPH H. CAMPBELL.
CHARLES H. CAMPBELL.

Witnesses:
DOMINGO A. USINA,
FRED WHITE.